US012770953B2

(12) United States Patent
Xu et al.

(10) Patent No.: US 12,770,953 B2
(45) Date of Patent: Oct. 20, 2026

(54) BATTERY ELECTRIC SYSTEM WITH ALTERNATING CURRENT SELF-HEATING MODE

(71) Applicant: GM GLOBAL TECHNOLOGY OPERATIONS LLC, Detroit, MI (US)

(72) Inventors: Shuonan Xu, Troy, MI (US); Lei Hao, Troy, MI (US); Neeraj S. Shidore, Novi, MI (US); Chandra S. Namuduri, Troy, MI (US); Nicholas W. Pinto, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 665 days.

(21) Appl. No.: 18/339,698

(22) Filed: Jun. 22, 2023

(65) Prior Publication Data

US 2024/0429481 A1 Dec. 26, 2024

(51) Int. Cl.
*H01M 10/615* (2014.01)
*H01M 10/42* (2006.01)
(Continued)

(52) U.S. Cl.
CPC ....... *H01M 10/615* (2015.04); *H01M 10/425* (2013.01); *H01M 10/625* (2015.04); (Continued)

(58) Field of Classification Search
CPC .. H01M 10/42; H01M 10/486; H01M 10/615; H01M 10/625; H01M 10/63; H01M 10/657; H01M 2010/4271; H01M 2220/20
See application file for complete search history.

(56) References Cited

U.S. PATENT DOCUMENTS

2012/0153901 A1* 6/2012 Hermann .......... H01M 10/6554 320/135
2015/0249349 A1* 9/2015 Binder .................. H01M 10/06 320/155
(Continued)

FOREIGN PATENT DOCUMENTS

AT 513335 A1 3/2014
CN 116231160 A * 6/2023 .......... H01M 10/615
(Continued)

OTHER PUBLICATIONS

Machine translation CN116231160 (Year: 2023).*

*Primary Examiner* — Victoria H Lynch
(74) *Attorney, Agent, or Firm* — Quinn IP Law

(57) ABSTRACT

A battery electric system includes an inverter connected to a battery pack and a direct current (DC) voltage bus, first and second electrical switches, and a battery controller. The first switch is connected between the inverter and battery pack, and opens during an alternating current (AC) self-heating mode of the battery pack. This mode includes generating an AC waveform through the battery pack via the inverter at a controlled amplitude. The second switch, which is connected to the inverter and the first switch, closes during the self-heating mode. The controller, in response to calibrated entry criteria, opens the first switch, closes the second switch, and controls ON/OFF conducting states of the power switches to self-heat the battery pack using the AC waveform. The entry criteria includes required charging of the battery pack while a temperature of the battery pack is less than a calibrated temperature limit.

20 Claims, 8 Drawing Sheets

(51) Int. Cl.

| | |
|---|---|
| ***H01M 10/625*** | (2014.01) |
| ***H01M 10/63*** | (2014.01) |
| ***H01M 10/657*** | (2014.01) |

(52) U.S. Cl.

CPC ......... *H01M 10/63* (2015.04); *H01M 10/657* (2015.04); *H01M 2010/4271* (2013.01); *H01M 2220/20* (2013.01)

(56) References Cited

U.S. PATENT DOCUMENTS

| | | | | |
|---|---|---|---|---|
| 2021/0043894 | A1* | 2/2021 | Cornelli .............. | H01M 10/486 |
| 2021/0218085 | A1* | 7/2021 | Ge .......................... | B60L 50/64 |
| 2023/0038790 | A1 | 2/2023 | Ling et al. | |
| 2023/0041713 | A1 | 2/2023 | Huang et al. | |

FOREIGN PATENT DOCUMENTS

| | | | |
|---|---|---|---|
| DE | 102021132525 | A1 | 9/2022 |
| DE | 102022111169 | A1 | 2/2023 |
| JP | 2020178509 | A | 10/2020 |

* cited by examiner

BATTERY ELECTRIC SYSTEM WITH ALTERNATING CURRENT SELF-HEATING MODE

INTRODUCTION

The present disclosure relates to circuit topologies and computer-based methods for heating an electrochemical battery pack. More specifically, aspects of the disclosure relate to the automated self-heating of a battery pack in the absence of a fluidic thermal management system or external heating device.

Battery electric systems of advanced hybrid-electric and full-electric vehicles draw electrical power from a high-energy traction battery pack. Discharging and charging modes of constituent electrochemical cells of the battery pack generates heat. Motor vehicle-based battery electric systems therefore use a thermal management system to help heat or cool the battery pack and related power electronics, typically by circulating coolant through and around the battery pack. Under cold ambient conditions, e.g., winter or cold weather operation, the battery pack may be warmed by the thermal management system before commencing charging operations. However, a battery electric system could lack a resident thermal management system, in which case heating of the battery pack would typically be accomplished by wrapping the battery pack in a resistive heating blanket or heating the surrounding ambient environment.

SUMMARY

Disclosed herein are circuit topologies and related control methods for self-heating a battery pack, in particular one that is characterized by an absence of a resident thermal management system, external heating blanket, or ambient heating. For example, boats, recreational vehicles (RVs), and other systems may use lower-cost lithium ferrophosphate (LFP) batteries that do not ordinarily permit charging operations to proceed when the battery temperature remains below a predetermined temperature limit. While such batteries could be heated using a heating blanket or by warming the surrounding ambient environment as noted above, such alternative heating techniques tend to be relatively slow and energy inefficient. The present alternating current (AC) waveform-based self-heating solution is therefore intended to realize faster and more energy-efficient self-heating of the battery pack in preparation for battery charging.

In an exemplary embodiment, a battery electric system includes a direct current (DC) voltage bus, a battery pack, an inverter connected to the DC voltage bus, first and second electrical switches, and an electronic battery controller. The first electrical switch ("first switch") is connected between the inverter and the battery pack, and is configured to open during an AC self-heating mode of the battery pack. Performance of the AC self-heating mode includes generating, via the inverter, an AC waveform through the battery pack at a controlled amplitude. The second electrical switch, which is connected to the inverter and the first electrical switch, is configured to close during the AC self-heating mode.

The battery controller in this embodiment is in communication with power switches of the inverter, and also with the first and second electrical switches. In response to calibrated entry criteria, the battery controller opens the first electrical switch, closes the second electrical switch, and controls ON/OFF conducting states of the power switches. In this manner, the battery controller self-heats the battery pack to a predetermined temperature limit using the AC waveform from the inverter. The entry criteria could include required charging of the battery pack while a temperature of the battery pack is less than the temperature limit, for example 32-35° F. threshold noted above or another application-suitable temperature.

The battery controller in one or more embodiments is configured to measure an open-circuit voltage (OCV) of the battery pack, compare the OCV of the battery pack to a predetermined OCV to determine whether the battery pack requires charging, and enter the AC self-heating mode when the battery pack requires charging.

Six of the power switches are configured as upper switches connected to the positive voltage rail of the DC voltage bus. Six of the power switches are configured as lower switches connected to the negative voltage rail of the DC voltage bus. The battery controller closes only one of the upper switches and only one of the lower switches during the AC self-heating mode.

The inverter in accordance with an aspect of the disclosure includes a transformer having primary and secondary windings, and a capacitor connected in parallel with the battery pack between the secondary winding and the battery pack. A current output node of the second switch may be connected to a current input node of the first switch, such that the second switch is arranged in series with the first switch. In such an embodiment, the AC waveform is generated in part through the secondary winding, e.g., using the capacitor.

The battery pack in one or more implementations may be constructed as a lithium-iron phosphate or lithium ferrophosphate (LFP) battery.

A DC load may be connected to the inverter, in which case the battery controller may power the DC load concurrently with the AC self-heating mode.

A vehicle is also disclosed herein. The vehicle is a recreational vehicle or a boat in different representative and non-limiting embodiments.

An embodiment of the vehicle includes a vehicle body and a battery electric system connected thereto. The battery electric system includes a DC voltage bus, a battery pack, e.g., an LFP battery, and an inverter connected to the DC voltage bus and having a plurality of solid-state power switches. The battery electric system also includes a first switch connected between the inverter and the battery pack, with the first switch being configured to open during an AC self-heating mode of the battery pack. As noted above, the AC self-heating mode includes generating an AC waveform through the battery pack at a controlled amplitude. A second switch, which is connected to the inverter and the first switch, closes during the AC self-heating mode.

As part of this embodiment, a battery controller is in communication with the power switches and the first and second switches. The battery controller is configured, in response to calibrated entry criteria, to open the first switch, close the second switch, and control ON/OFF conducting states of the power switches to thereby self-heat the battery pack to a predetermined temperature using the AC waveform. The entry criteria may include a required charging of the battery pack while a battery temperature of the battery pack is less than a calibrated temperature limit.

The battery controller may measure an OCV of the battery pack and then compare the OCV to a predetermined OCV to determine the required charging.

The DC voltage bus has a positive voltage rail and a negative voltage rail. Six of the power switches are upper switches connected to the positive voltage rail. Six of the power switches are lower switches connected to the negative voltage rail. The battery controller is configured to close only one of the upper switches and only one of the lower switches during the AC self-heating mode.

The inverter may include a transformer having a primary winding and a secondary winding, and a capacitor connected in parallel with the battery pack between the secondary winding and the battery pack.

A current output node of the second switch is connected to a current input node of the first switch in a possible construction, such that the second switch is in series with the first switch. In such an embodiment, the AC current is generated in part through the secondary winding. Alternatively, the AC current is generated in part using the capacitor.

Also disclosed herein is a method for performing AC self-heating mode of a battery pack in a battery electric system having a direct current (DC) bus. The method may include, in response to calibrated entry criteria: opening a first switch, closing a second electrical switch, and controlling ON/OFF conducting states of solid-state power switches of an inverter via a battery controller. The first switch is connected between the inverter and the battery pack. The second switch is connected to the inverter and the first switch. The method in this embodiment may also include generating an AC waveform through the battery pack at a controlled amplitude through the second switch and a set of the power switches having an OFF conducting state to thereby self-heat the battery pack to a predetermined temperature. The entry criteria may include a required charging of the battery pack while a battery temperature of the battery pack is less than a calibrated temperature limit.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 1:
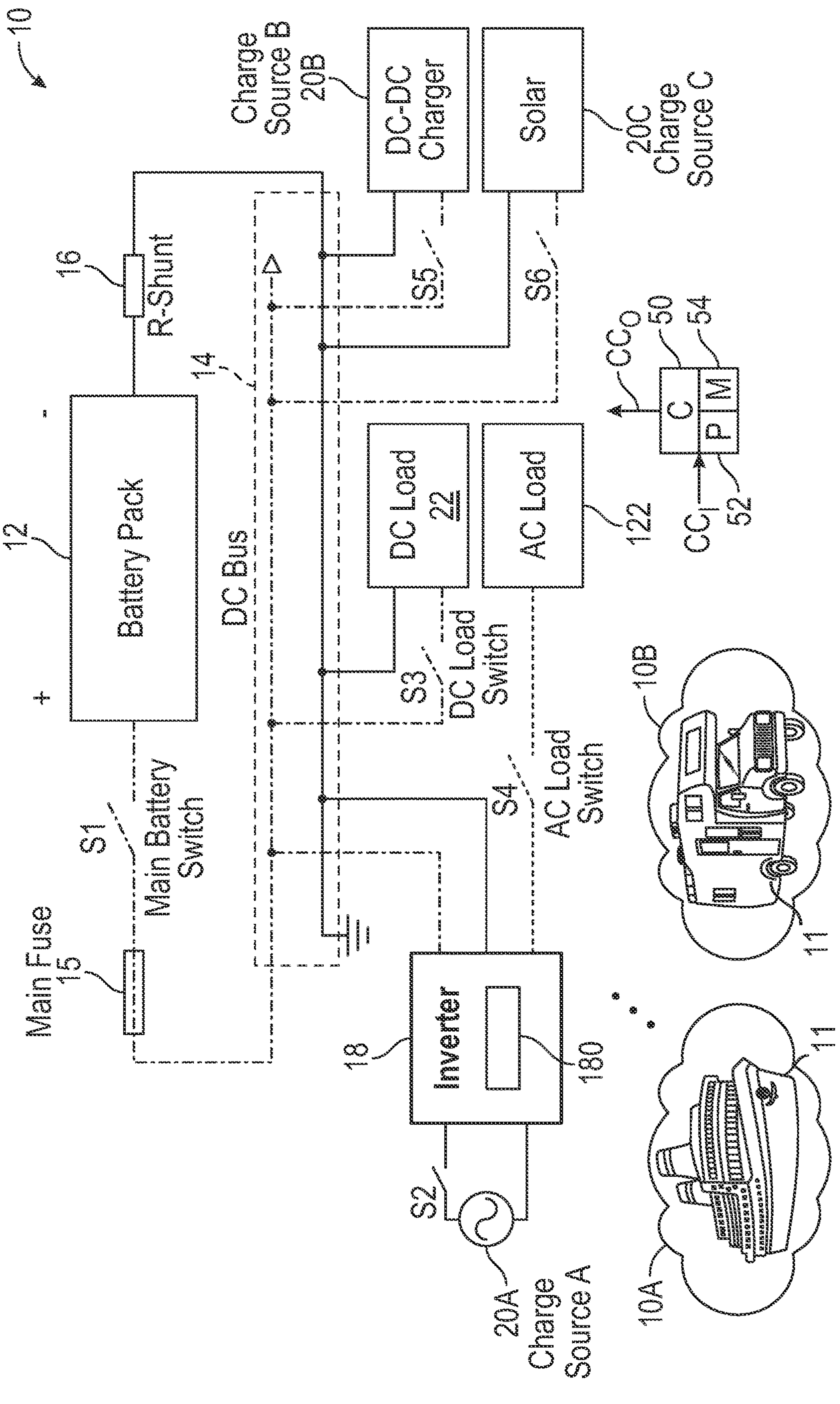
FIG. 1 illustrates a battery electric system having a battery pack that is self-heated via the alternating current (AC) waveform and the inverter-based control methodology set forth herein.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Referring to the drawings, wherein like reference numerals correspond to like or similar components throughout the several Figures, a battery electric system 10 is illustrated in FIG. 1 that is configured to perform alternating current (AC)-based self-heating of an associated battery pack 12 as set forth herein. The battery electric system 10, which in one or more embodiments may be used aboard a boat 10A or another watercraft, a recreational vehicle 10B, or another vehicle having a body 11, includes the battery pack 12, which in turn is connected to or positioned relative to the body 11. The battery pack 12 is connected to a direct current (DC) bus 14 via a main battery switch S1, a main fuse 15, and a shunt resistor (R-Shunt) 16 as shown. The battery electric system 10 also includes an inverter 18, e.g., a power inverter/charging module, which in turn is connected to the DC voltage bus 14. The inverter 18 is connectable to an offboard alternating current (AC) charging station 20A via a switch S2, which is also referred to hereinafter as Charge Source A.

Figure 3:
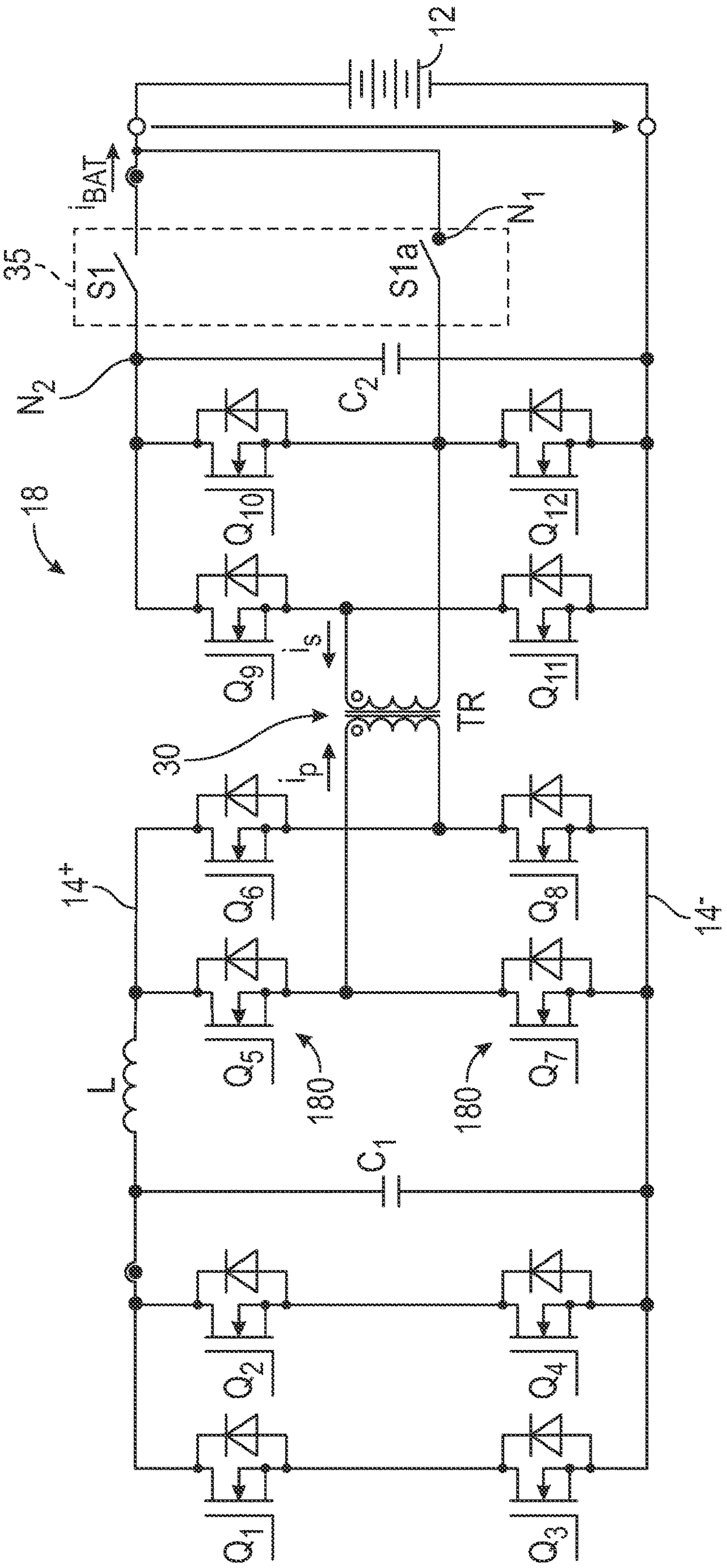
FIGS. 3 and 4 are representative circuit topologies of the inverter and battery pack shown in FIGS. 1 and 2.
Figure 4:
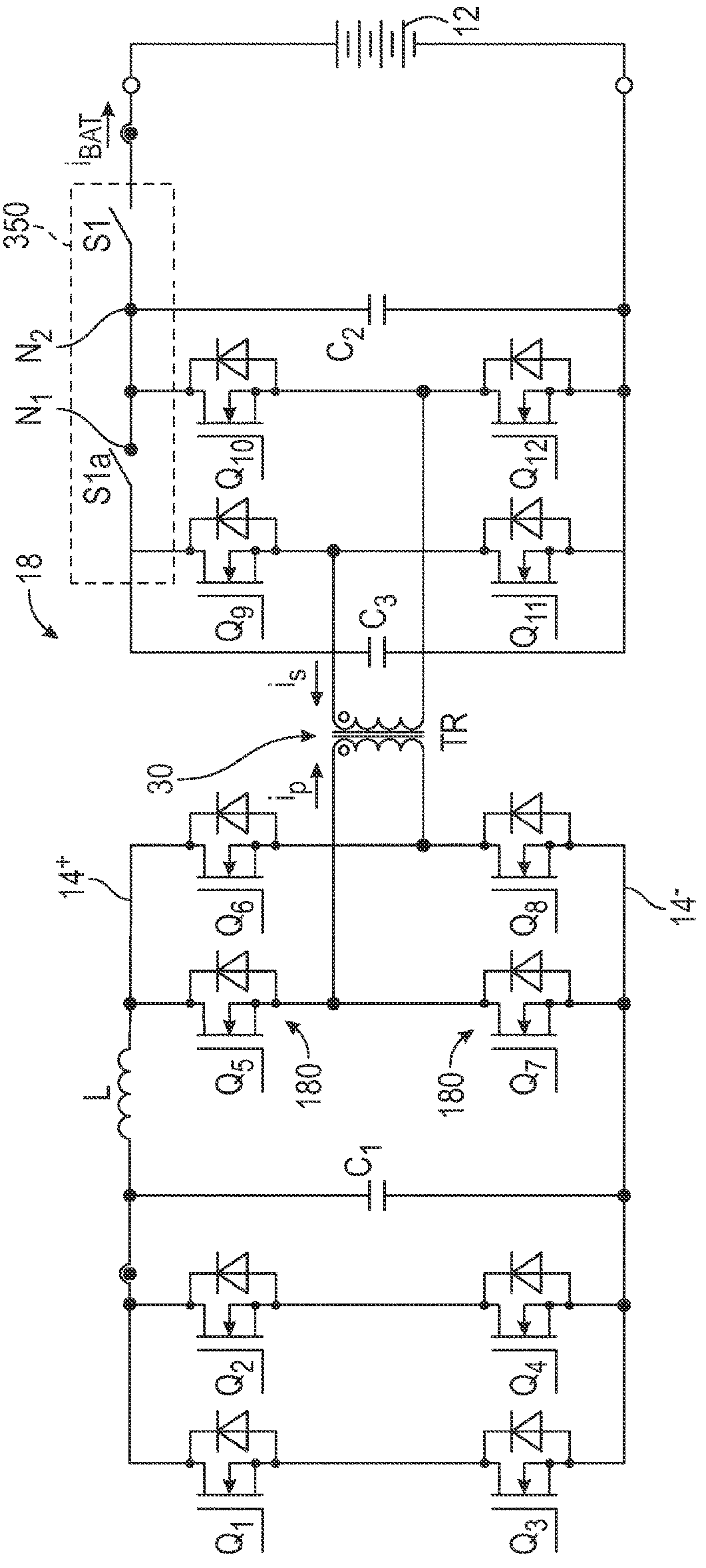

As appreciated by those skilled in the art, the inverter 18 includes a plurality of solid-state power switches 180, which are shown in detail as power switches $Q_1, Q_2, \ldots, Q_{12}$ in the non-limiting embodiments of FIGS. 3 and 4. Individual ON/OFF conducting states of the various power switches 180 by a resident battery controller (C) 50 is used to output a DC voltage to the DC voltage bus 14 when charging the battery pack 12 via the AC charging station 20A. The same power switches 180 are controlled via the battery controller 50 during AC self-heating modes of the battery pack 12, with an exemplary embodiment of a method 100 for performing AC self-heating of the battery pack 12 described below with reference to FIG. 6.

The DC voltage bus 14 shown in FIG. 1 may be connected to several other DC devices, including but not necessarily limited to a DC load 22, a DC-DC charger 20B, and a solar charger 20C, with the latter two devices respectively acting as Charge Sources B and C. Thus, the battery pack 12 may be recharged via Charge Source A, B, or C as needed based on availability. For example, if the battery electric system 10 of FIG. 1 were to be used as part of the boat 10A while at sea, Charge Source A would not normally be available, but solar charging might remain available via Charge Source C. However, charging of the battery pack 12 by the various Charge Sources A, B, and C of FIG. 1 might not be permitted by the battery controller 50 when the temperature of the battery pack 12 remains below a specified lower temperature limit, e.g., about 32-35° F. in some implementations. In this case, the battery controller 50 executes instructions embodying the method 100 of FIG. 6 to initiate the above-noted AC self-heating of the battery pack 12, with this process occurring via switching control of the inverter 18 as set forth in detail below.

Figure 1A:
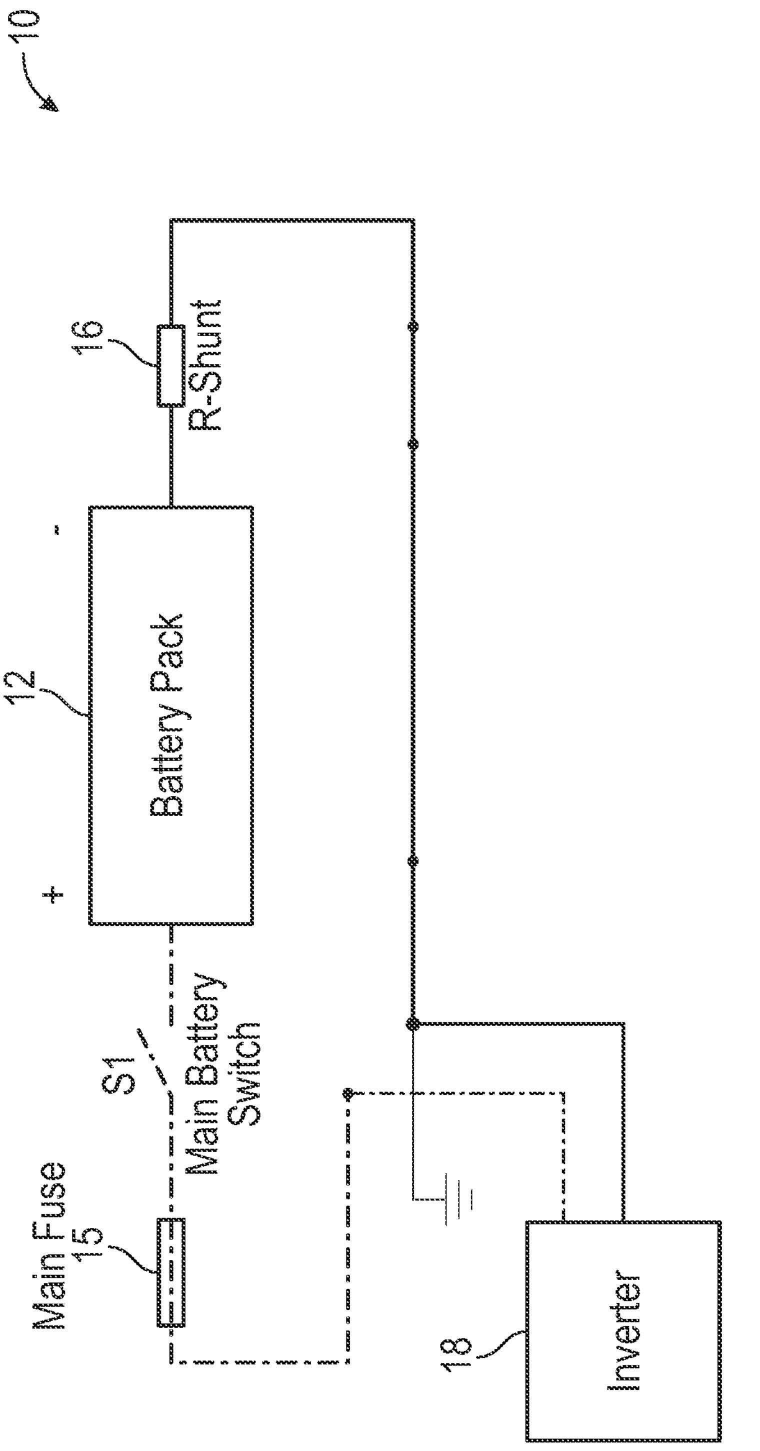
FIG. 1A illustrates active portions of the battery electric system of FIG. 1 when AC self-heating of the battery pack is ongoing.

To that end, the main battery switch S1, acting herein as a first electrical switch of the battery electric system 10, is connected between the inverter 18 and the battery pack 12. The main battery switch S1 is configured to open in response to control signals ($CC_O$) from the battery controller 50 during AC self-heating modes. During this mode, with the active components of the battery electric system 10 illustrated in FIG. 1A and others shown in phantom line or removed for illustrative simplicity and clarity, the battery controller 50 operates the inverter 18 to output an AC current waveform through the battery pack 12 at a controlled amplitude, as illustrated in the representative AC waveform 25 of FIG. 2. As described below with particular reference to FIGS. 3 and 4, a second electrical switch S1*a* possibly housed within the inverter 18 is connected to the first electrical switch S1, with the second electrical switch S1*a* as contemplated herein being configured to close during the AC self-heating mode.

Still referring to FIG. 1, the battery controller 50 is in communication with the power switches 180, the first electrical switch S1, and the second electrical switch S1*a*, along with various other switches S2, S3, S4, S5, and S6 as shown. The switches S2-S6, with switch S3 being a DC load switch for connecting and disconnecting the DC load 22, and switch S4 being an AC load switch for connecting and disconnecting the AC load 122, are positioned between the DC voltage bus 14 and the various AC and DC devices, i.e., the DC load 22, the AC load 122, the DC-DC charger 20B, and the solar charger 20C.

Figure 2:
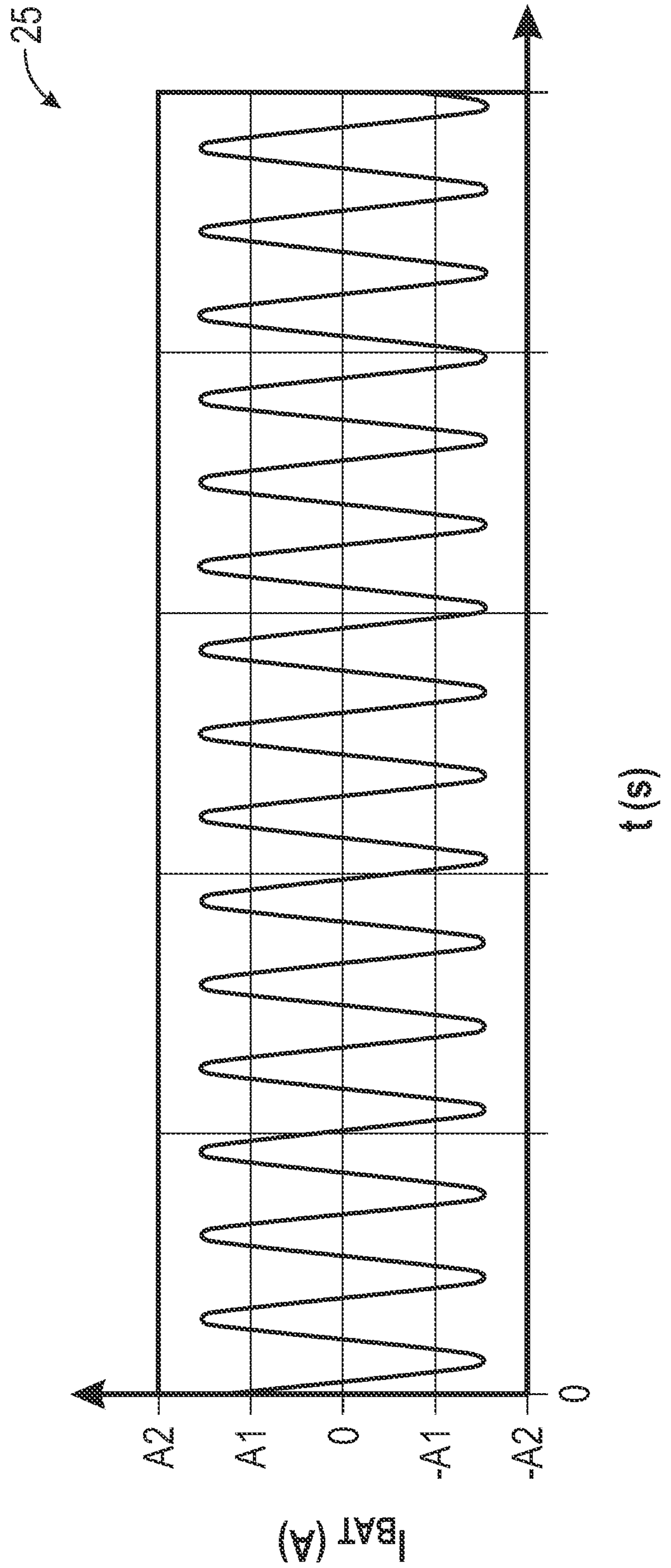
FIG. 2 is a time plot of battery current during an AC self-heating mode, with battery current in amps depicted on the vertical axis and time in seconds depicted on the horizontal axis.

In response to calibrated entry criteria, the battery controller 50 is configured to open the first electrical switch S1, close the second electrical switch S1*a*, and control the above-noted ON/OFF conducting states of the power switches 180 of the inverter 18 to thereby self-heat the battery pack 12 to at least a predetermined temperature limit using the resulting AC waveform, e.g., the AC waveform 25 of FIG. 2. The entry criteria as contemplated herein may include a determination by the battery controller 50 that the battery pack 12 requires charging, e.g., via an open-circuit voltage (OCV) measurement as described below, while a temperature of the battery pack 12 remains less than a calibrated temperature limit.

Within the scope of the present disclosure, the battery controller 50 illustrated schematically in FIG. 1 includes one or more processors (P) 52 configured to receive or generate input signals ($CC_1$). In response to the input signals ($CC_1$), the battery controller 50 executes the method 100 of FIG. 6 as one or more algorithms. Computer-readable code or instructions for implementing such a method 100 may be stored in memory (M) 54 of the controller 50, including tangible, non-transitory computer-readable storage medium, e.g., magnetic or optical media, CD-ROM, and/or solid-state/semiconductor memory (e.g., various types of RAM or ROM).

The term "controller" and related terms such as control module, module, control, control unit, processor, and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). Non-transitory components of the memory 54 are those which are capable of storing machine-readable instructions in the form of one or more software or firmware programs or routines, combinational logic circuit(s), input/output circuit(s) and devices, signal conditioning and buffer circuitry and other components that can be accessed by the processor(s) 52 to provide the described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example about 50-100 microsecond (ms) intervals during ongoing operation. Alternatively, routines may be executed in response to occurrence of a triggering event.

Referring now to FIG. 3, an embodiment of the battery electric system 10 of FIG. 1 suitable for implementing the AC self-heating solutions described herein is shown in a more detailed view of the inverter 18. The power switches 180 of FIG. 1, which may be embodied as IGBTs as shown, or alternatively as MOSFETs, thyristors, etc., are connected to a positive voltage rail $\mathbf{14}^+$ and a negative voltage rail $\mathbf{14}^-$ of the above-described DC voltage bus 14 of FIG. 1. The power switches 180 connected to the positive voltage rail $\mathbf{14}^+$ are referred to herein and in the art as "upper switches", while the power switches 180 that are connected to the negative voltage rail $\mathbf{14}^+$ are referred to as "lower switches". In the illustrated inverter 18 of FIG. 3, the upper switches include the switches $Q_1$, $Q_2$, $Q_5$, $Q_6$, $Q_9$, and $Q_{10}$. The lower switches in this embodiment include the remaining switches $Q_3$, $Q_4$, $Q_7$, $Q_8$, $Q_{11}$, and $Q_{12}$.

The illustrated circuit also includes a transformer (TR) 30 providing galvanic isolation as appreciated in the art, with first and second capacitors $C_1$ and $C_2$ arranged in parallel with each other within the inverter 18. Other depicted circuit elements include an inductor (L) disposed on the positive voltage rail $\mathbf{14}^+$, with the battery pack 12 shown in parallel with the second capacitor $C_2$. A switching circuit 35 is formed by the above-noted first and second electrical switches S1 and S1*a*.

In the embodiment of FIG. 3, where six of the power switches 180 are upper switches connected to the positive voltage rail $\mathbf{14}^+$ and six of the power switches 180 are lower switches connected to the negative voltage rail $\mathbf{14}^-$, the battery controller 50 is configured to close only one of the upper switches, in this instance switch $Q_{10}$, and to close only one of the lower switches, $Q_{12}$, during the AC self-heating mode. That is, switches $Q_1$-$Q_9$ and $Q_{11}$ are turned OFF/opened by the battery controller 50 during the AC self-heating mode. The first switch S1 remains OFF/open, while the second switch S1*a* in this embodiment is turned ON/closed. Thus, the switches $Q_{10}$ and $Q_{12}$, the second capacitor $C_2$, and the battery pack 12 and intervening cabling inductance (L) are used as a quasi-resonant circuit to generate the battery current ($i_{BAT}$) having the AC current waveform 25 of FIG. 2 through the battery pack 12. Primary and secondary current $i_p$ and $i_s$ flow through the respective primary and secondary windings of the transformer 30 as shown.

Referring now to FIG. 4, an alternative switching circuit 350 is shown in which the first and second electrical switches S1 and S1*a* are arranged in series. That is, relative to a current flow from the power switches 180 of the inverter 18, a current output node N1 of the second electrical switch S1*a* is connected to a current input node N2 of the first electrical switch S1, such that the second electrical switch S1*a* is in series with the first electrical switch S1.

In this arrangement, the AC current waveform 25 of FIG. 2 is generated in part through the secondary winding of the transformer 30. The power switches $Q_1$-$Q_8$ are commanded OFF by the battery controller 50 during the AC self-heating mode, i.e., are opened or not conducting. The first electrical switch S1 is turned ON. The second electrical switch S1*a* is turned OFF. The switches $Q_9$-$Q_{11}$ along with the secondary winding of the transformer 30 are thus used to generate the battery current ($i_{BAT}$) with the AC waveform 25 of FIG. 2.

Figure 5A:
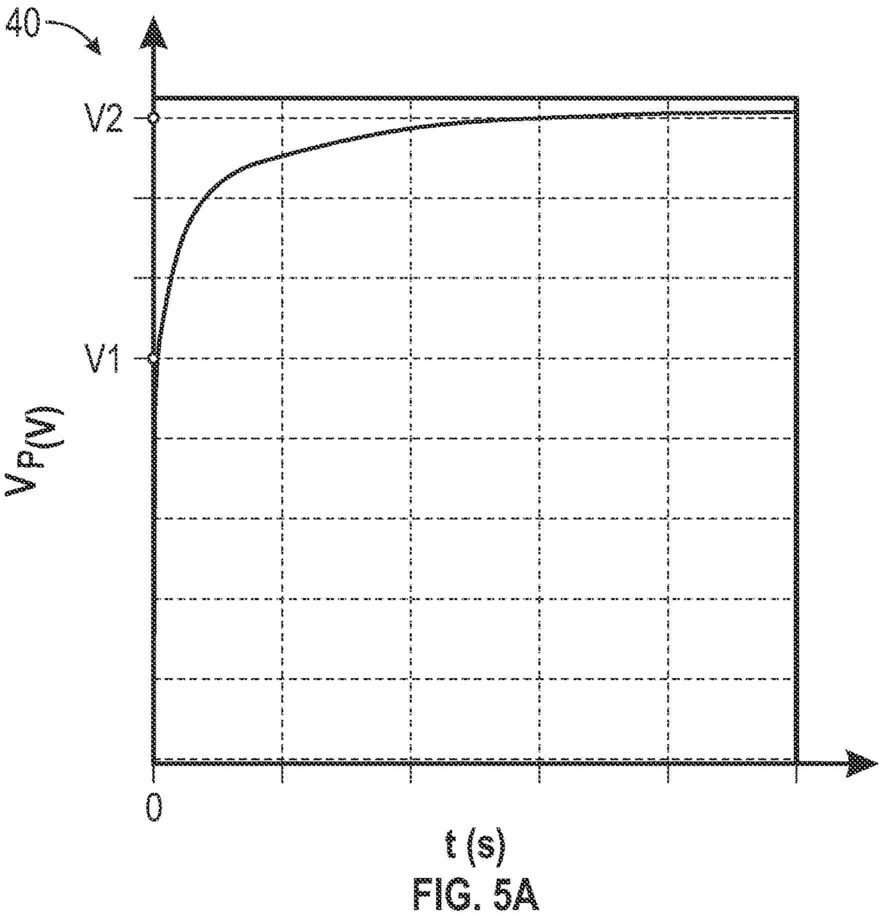
FIGS. 5A, 5B, 5C, and 5D are representative primary voltage, transformer primary current, transformer secondary current, and battery current waveforms resulting from operation of the AC self-heating approach of the present disclosure.
Figure 5B:
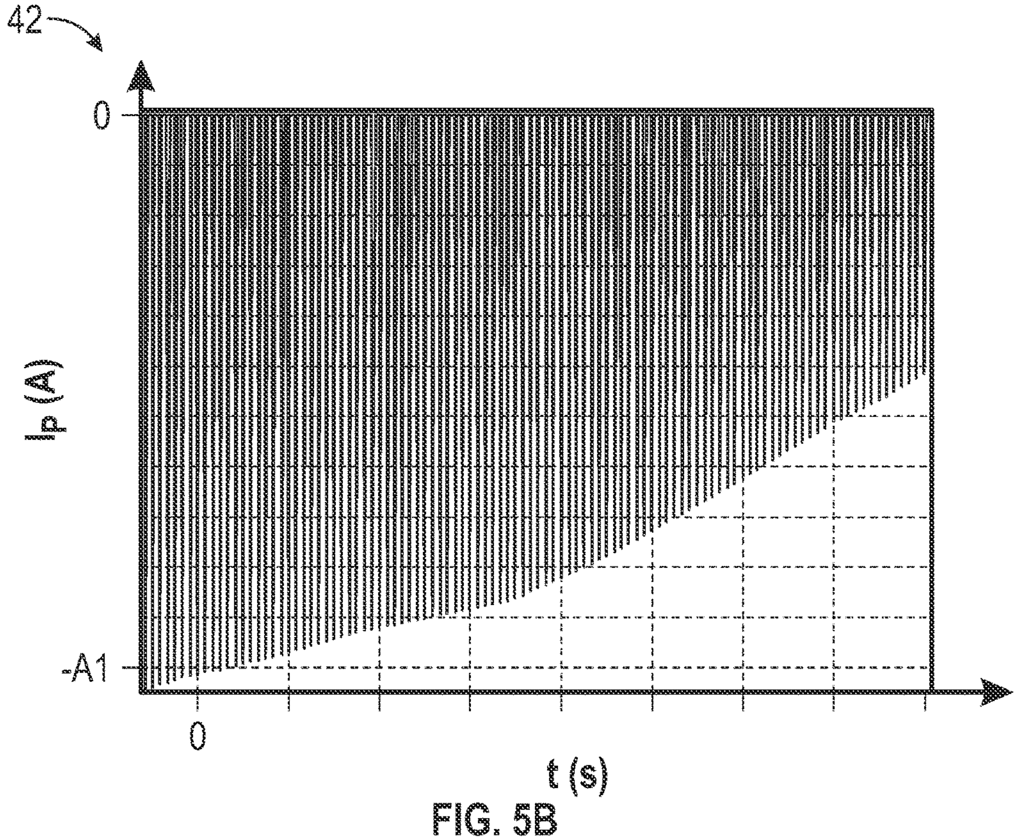
Figure 5C:
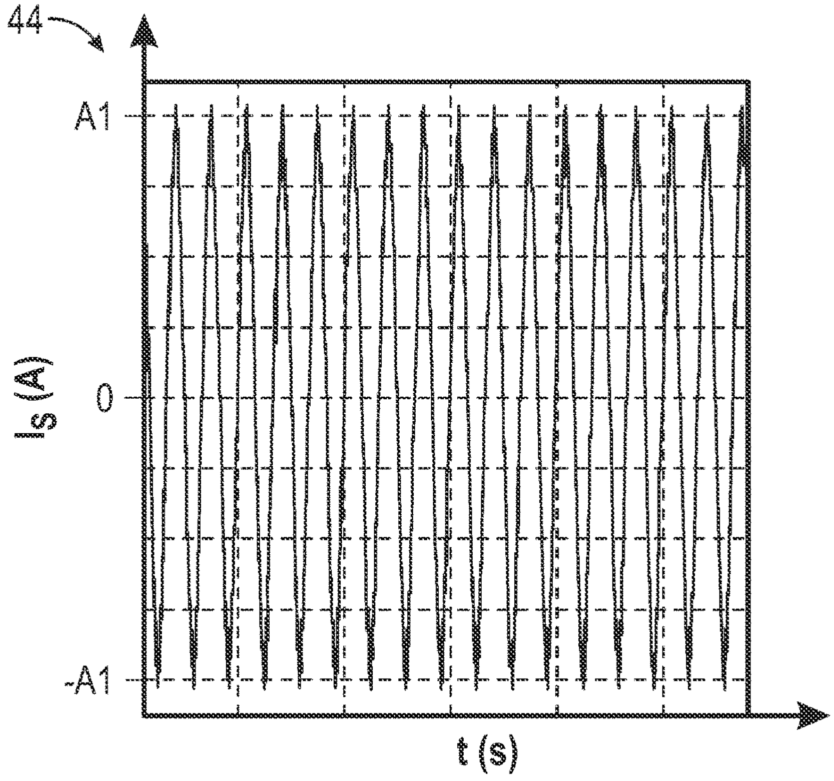
Figure 5D:
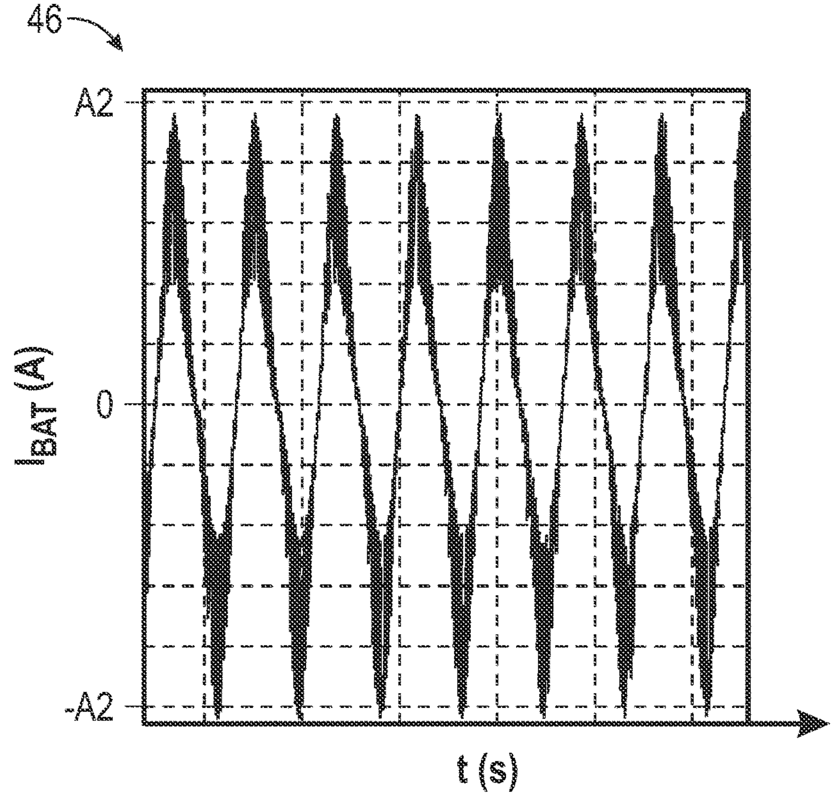

Referring briefly to FIGS. 5A, 5B, 5C, and 5D, operation of the switching circuits 35 and 35 of respective FIGS. 3 and 4 along with PWM control of the various power switches 180 as set forth above corresponds to several exemplary waveforms. For instance, the primary voltage ($V_P$) at an input side of the first capacitor $C_1$ is shown as voltage trace 40 of FIG. 5A, e.g., rising from V1 to just under V2 in a short amount of time. FIGS. 5B and 5C illustrate the primary ($I_P$) and secondary ($I_S$) transformer currents 42 and 44, respectively, during operation of the inverter 18 in the AC self-heating mode. Effective self-heating relies on the oscillating current as shown as the battery current trace 46 of FIG. 5D, $I_{BAT}$, which in turn reflects the desired current waveform 25 (see FIG. 2) within the battery pack 12 that warms the battery pack 12 from within.

Mathematically, the present approach may be understood using a target root mean square (RMS) current. This value may be calculated based on a target temperature rise as follows:

$$I^2_{cell,RMS} = \frac{1}{R_{cell}}\left(\left(\frac{1}{\#\text{ cells in battery}} \times m_{battery} \times C_{p,battery} \times \frac{dT_{cell}}{dt}\right) - hA(T_{cell} - T_{ambient})\right)$$

Using nominal example values solely for illustration, a representative arrangement of 100 amp-hour (Ah) battery cells with a nominal voltage of 12.8V, and a total of 400 Ah and 5.12 kWh, and assuming a 3 kW embodiment of the inverter 18, the battery pack 12 would see a maximum heating current (RMS) of 300 A, with a cell current ($I_{cell,\ RMS}$) of 75 A. Assuming the resistance per cell ($R_{cell}$) is 8 mΩ, the per-cell heating power would be 45 W, with a total heating power of 720 W. Now, assuming a cell level of 250 kWh/kg, the total cell mass ($m_{battery}$) is 20.5 kg. With a specific heat capacity ($C_{p,battery}$) of 1130 J/kgK for an exemplary LFP embodiment of the battery pack 12, the above formulation results in a temperature rise of 1.86° C./minute. As most commercially-available inverters are rates for 2 kW or more and 300 A (RMS), such a rate would be more than sufficient to provide the necessary heating power in an efficient and uniform manner when self-heating the battery pack 12 in accordance with the disclosure. As an additional benefit, the present method does not affect connected DC loads. AC loads are temporarily affected, however, due to the use of the power switches 180 of FIGS. 3 and 4 to drive the AC self-heating process.

Figure 6:
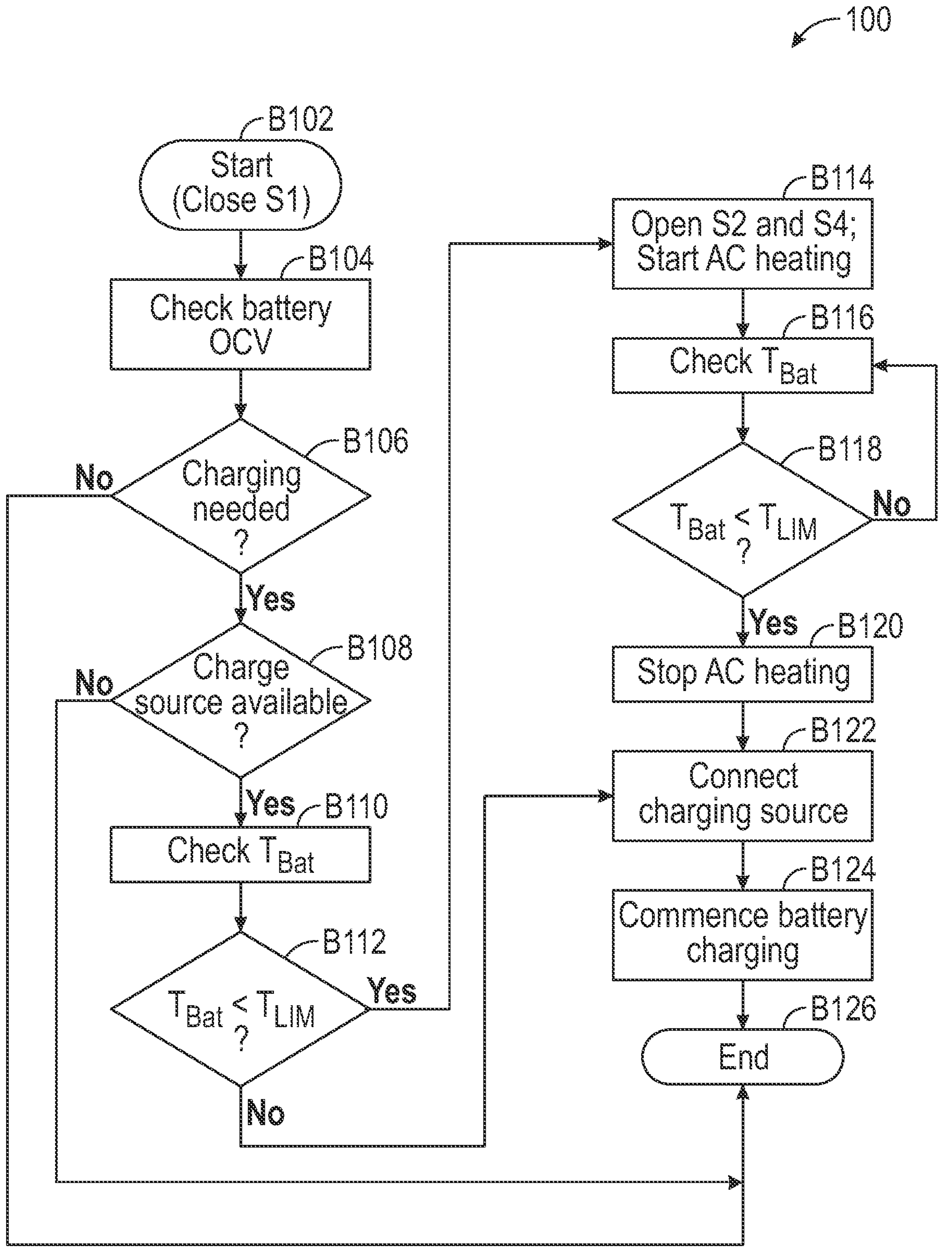
FIG. 6 is a flow chart illustrating an embodiment of the AC self-heating method set forth herein.

Referring now to FIG. 6, the method 100 is described in terms of discrete logic blocks or code segments. Each logic block of the method 100 may be stored in memory 54 of FIG. 1 as computer-readable instructions, with such instructions executed by the processor 52 to cause the controller 50 to perform the described functions.

The method 100 commences at block B102 in response to calibrated entry criteria. For example, the method 100 could proceed at regular timer-based intervals or in response to a user-initiated input. The battery controller 50 of FIG. 1 closes the first electrical switch S1 at the onset of method 100 and then proceeds to block B104.

Block B104 of FIG. 6 includes determining whether charging of the battery pack 12 is required. This verification could be considered part of the entry criteria or a subsequent step. In a possible implementation, block B104 could include measuring the open-circuit voltage (OCV) of the battery pack 12, i.e., the battery voltage when all loads on the battery pack 12 are fully disconnected. The measured OCV is then stored in memory 54 of the battery controller 50 of FIG. 1 as the method 100 proceeds to block B106.

At block B106, the battery controller 50 may compare the measured OCV from block B104 to a threshold OCV value to determine whether charging of the battery pack 12 is required. The method 100 proceeds to block B126 when charging is not required, with the method 100 otherwise proceeding to block B108.

At block B108, the battery controller 50 next determines, in response to charging being required, whether Charge Sources A, B, or C are presently available. If so, the method 100 proceeds to block B110, with the method 100 otherwise proceeding to block B126.

Block B110 of the method 100 shown in FIG. 6 includes checking the battery temperature ($T_{Bat}$). Block B110 may entail measuring the battery temperature using one or more temperature sensors (not shown) disposed on or within the battery pack 12, as appreciated in the art, and then reporting the measured battery temperature to the battery controller 50 as part of the input signals ($CC_1$) of FIG. 1. The method 100 thereafter proceeds to block B112.

Block B112 includes comparing the measured battery temperature from block B110 to a calibrated temperature limit ($T_{Lim}$) below which charging of the battery pack 12 is not permitted. In a non-limiting implementation, the calibrated temperature limit could be about 32-35° F. In other embodiments, the calibrated temperature limit could be variable, for instance set at different temperatures depending on ambient conditions, or user-selectable above a particular manufacturer limit. The method 100 proceeds to block B114 when the measured battery temperature is less than the calibrated temperature limit, and to block B122 in the alternative when the measured battery temperature equals or exceeds such a calibrated temperature limit.

Still referring to FIG. 6, and continuing with block B114, the method 100 of FIG. 6 proceeds by opening the switches S2 and S4 of FIG. 1. The controller 50 then controls the ON/OFF state of the various power switches 180 and the first and second switches S1 and S1*a* of FIGS. 3 and 4 as set forth above to commence AC self-heating. The method 100 thereafter proceeds to block B116.

At block B116, the battery controller 50 once again measures the battery temperature ($T_{Bat}$) as noted above in block B110, thereafter proceeding to block B118.

Block B118, which is analogous to block B112 as described above, includes comparing the measured temperature to the calibrated temperature limit ($T_{LIM}$). Blocks B116 and B118 continue in a loop until the measured temperature equals or exceeds the calibrated temperature limit, or until a predetermined time limit is reached. The method 100 then proceeds to block B120.

At block B120 of FIG. 6, the battery controller 50 discontinues AC self-heating of the battery pack 12. The affected power switches 180 of the inverter 18 shown in FIGS. 3 and 4 are returned to their initial states, the first electrical switch S1 is closed, and the second electrical switch S1*a* is either opened or closed depending on the embodiment. The method 100 then proceeds to block B122.

At block B122, the battery controller 50 may connect the battery electric system 10 of FIG. 1 to an available Charge Source A, B, or C. The method 100 then proceeds to block B124.

Block B124 includes commencing charging of the battery pack 12 using the connected Charge Source A, B, or C from block B120. The method 100 then proceeds to block B126.

The battery controller 50 when performing the method 100 of FIG. 6 thus provides a myriad of benefits for users of the battery electric system 10 illustrated in FIG. 1. Offboard charging of lithium-ion batteries is typically precluded when the battery is too cold. While battery electric vehicles have integrated thermal management systems to regulate battery temperature and prepare onboard propulsion batteries for charging, the lower cost batteries typically used in electrical systems of RVs, boats, and other systems tend not to be so equipped, as noted above.

The absence of a thermal management system in turn requires slower, less efficient ambient heating or the use of heating blankets. The present solutions instead take advantage of available hardware of an onboard inverter/charger, exemplified herein as the inverter 18 of FIG. 1, with the one additional switch S1*a*, to rapidly increase battery temperature in advance of offboard charging using a quasi-resonant circuit and the AC waveform 25 of FIG. 2. Charging is thereafter permitted to proceed once the battery has been sufficiently warmed. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A battery electric system, comprising:

a direct current (DC) voltage bus;

a battery pack having a battery temperature;

an inverter connected to the DC voltage bus and including a plurality of solid-state power switches operable for outputting an alternating current (AC) waveform;

a transformer having a primary winding and a secondary winding;

a capacitor connected in parallel with the battery pack;

a first electrical switch connected between the inverter and the battery pack, the first electrical switch being configured to open during an AC self-heating mode of the battery pack;

a second electrical switch, in parallel with the first electrical switch, connected to the inverter and the first electrical switch, and configured to close during the AC self-heating mode of the battery pack; and a battery controller in communication with the plurality of solid-state power switches, the first electrical switch, and the second electrical switch, wherein the battery controller is configured, prior to charging the battery pack, to selectively open the first electrical switch, close the second electrical switch, and control individual ON/OFF conducting states of the plurality of solid-state power switches, and thereby heat the battery pack via the AC waveform, when the battery temperature is less than a calibrated temperature limit.

2. The battery electric system of claim 1, wherein the battery controller is configured to measure an open-circuit voltage (OCV) of the battery pack as a measured OCV, compare the measured OCV to a predetermined OCV to determine whether the battery pack requires charging, and enter the AC self-heating mode when the battery pack requires charging.

3. The battery electric system of claim 1, wherein the DC voltage bus has a positive voltage rail and a negative voltage rail, and six of the plurality of solid-state power switches are configured as upper solid-state power switches connected to the positive voltage rail, and six of the plurality of solid-state power switches are configured as solid-state power lower switches connected to the negative voltage rail, and the battery controller is configured to alternatively close only one of the upper solid-state power switches and only one of the lower solid-state power switches during the AC self-heating mode, thereby creating a self-heating alternating current flowing through the battery pack.

4. The battery electric system of claim 1, wherein the AC waveform is generated in part using the secondary winding and the capacitor.

5. The battery electric system of claim 1, wherein the battery pack is a lithium-ferrophosphate (LFP) battery.

6. The battery electric system of claim 1, further comprising:

a DC load connected to the inverter, wherein the battery controller is configured to power the DC load via the inverter concurrently with performing the AC self-heating mode.

7. A vehicle, comprising:

a vehicle body; and a battery electric system connected to the vehicle body and comprising:

a direct current (DC) voltage bus;

a battery pack;

an inverter connected to the DC voltage bus and having a plurality of solid-state power switches;

a transformer having a primary winding and a secondary winding;

a capacitor connected in parallel with the battery pack;

a first electrical switch connected between the inverter and the battery pack, the first electrical switch being configured to close during an alternating current (AC) self-heating mode of the battery pack, wherein the AC self-heating mode includes generating an AC waveform through the battery pack at a controlled amplitude;

a second electrical switch connected to the inverter and the first electrical switch, and configured to open during the AC self-heating mode; and a battery controller in communication with the plurality of solid-state power switches, the first electrical switch, and the second electrical switch;

wherein a current output node of the second electrical switch is connected to a current input node of the first electrical switch, such that the second electrical switch is arranged in series with the first electrical switch;

wherein the second electrical switch is located in-between the first electrical switch and the secondary winding of the transformer;

wherein the battery controller is configured, in response to calibrated entry criteria, to close the first electrical switch, open the second electrical switch, and control ON/OFF conducting states of the plurality of solid-state power switches to thereby self-heat the battery pack to a predetermined temperature using the AC waveform;

wherein the calibrated entry criteria include a required charging of the battery pack while a battery temperature of the battery pack is less than a calibrated temperature limit;

wherein the AC waveform is generated in part through the secondary winding and the capacitor; and wherein the battery controller is configured, prior to charging the battery pack, to selectively close the first electrical switch, and open the second electrical switch.

8. The vehicle of claim 7, wherein the vehicle is a recreational vehicle.

9. The vehicle of claim 7, wherein the vehicle is a boat.

10. The vehicle of claim 7, wherein the battery controller is configured to measure an open-circuit voltage (OCV) of the battery pack as a measured OCV, and to compare the measured OCV to a predetermined OCV to determine the required charging.

11. The vehicle of claim 7, wherein the DC voltage bus has a positive voltage rail and a negative voltage rail, and six of the plurality of solid-state power switches are upper switches connected to the positive voltage rail, and six of the plurality of solid-state power switches are lower switches connected to the negative voltage rail, and the battery controller is configured to close only one of the upper switches and only one of the lower switches during the AC self-heating mode.

12. The vehicle of claim 7, wherein the inverter includes a transformer having a primary winding and a secondary winding, and a capacitor connected in parallel with the battery pack between the secondary winding and the battery pack.

13. The vehicle of claim 7, wherein the AC current is generated in part using the secondary winding and the capacitor.

14. The vehicle of claim 7, wherein the battery pack is a lithium ferro-phosphate (LFP) battery.

15. A method for performing alternating current (AC) self-heating mode of a battery pack in a battery electric system having a direct current (DC) voltage bus, the method comprising:

in response to calibrated entry criteria, opening a first electrical switch, closing a second electrical switch connected in parallel with the first electrical switch, and controlling ON/OFF conducting states of a plurality of solid-state power switches of an inverter via a battery controller, wherein the first electrical switch is connected between the inverter and the battery pack, and wherein the second electrical switch is connected to the inverter and the first electrical switch; and generating an AC waveform through the battery pack at a controlled amplitude through the second electrical switch and a set of the plurality of solid-state power switches having an OFF conducting state to thereby self-heat the battery pack to a predetermined temperature;

wherein the calibrated entry criteria include a required charging of the battery pack while a battery temperature of the battery pack is less than a calibrated temperature limit;

wherein the DC voltage bus has a positive voltage rail and a negative voltage rail;

wherein six of the plurality of solid-state power switches are upper solid-state power switches connected to the positive voltage rail;

wherein six of the plurality of solid-state power switches are lower solid-state power switches connected to the negative voltage rail;

wherein the set of the plurality of solid-state power switches having an OFF conducting state includes only one of the upper solid-state power switches and only one of the lower solid-state power switches; and wherein the battery electric system further comprises:

a transformer having a primary winding and a secondary winding;

a capacitor connected in parallel with the battery pack; and a battery controller is in communication with the plurality of solid-state power switches, the first electrical switch, and the second electrical switch, wherein the battery controller is configured, prior to charging the battery pack, to selectively open the first electrical switch, close the second electrical switch, and control individual ON/OFF conducting states of the plurality of solid-state power switches, and thereby heat the battery pack via the AC waveform, when the battery temperature is less than a calibrated temperature limit.

16. The method of claim 15, further comprising:

measuring an open-circuit voltage (OCV) of the battery pack as a measured OCV; and comparing the measured OCV to a predetermined OCV limit to determine the required charging.

17. The method of claim 15, further comprising:

powering a DC load via the inverter concurrently with performing the AC self-heating mode.

18. The method of claim 15, wherein the battery controller closes only one of the upper solid-state power switches and closes only one of the lower solid-state power switches during the AC self-heating mode;

wherein the remaining upper solid-state power switches are opened; and wherein the remaining lower solid-state power switches are opened.

19. The method of claim 15, wherein the plurality of solid-state power switches are controlled by one or more Pulse Width Modulated (PWM) controllers.

20. The battery electric system of claim 1, wherein the plurality of solid-state power switches are controlled by one or more Pulse Width Modulated (PWM) controllers.

* * * * *